United States Patent (10) Patent No.: US 9,265,230 B2
Van Aalst (45) Date of Patent: Feb. 23, 2016

(54) ELECTRIC FENCE AND ASSEMBLY THEREWITH

(71) Applicant: LELY PATENT N.V., Maassluis (NL)

(72) Inventor: Kristiaan Leonard Van Aalst, Maassluis (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 14/394,383

(22) PCT Filed: Mar. 25, 2013

(86) PCT No.: PCT/NL2013/050217
§ 371 (c)(1),
(2) Date: Oct. 14, 2014

(87) PCT Pub. No.: WO2013/157935
PCT Pub. Date: Oct. 24, 2013

(65) Prior Publication Data
US 2015/0053906 A1    Feb. 26, 2015

(30) Foreign Application Priority Data

Apr. 20, 2012    (NL) .................................... 2008670

(51) Int. Cl.
*A01K 3/00*        (2006.01)
*E04H 17/02*       (2006.01)

(52) U.S. Cl.
CPC ............... *A01K 3/005* (2013.01); *E04H 17/02* (2013.01)

(58) Field of Classification Search
CPC ........... A01K 3/00; A01K 3/005; A01K 5/00; A01K 1/105
See application file for complete search history.

(56) References Cited

U.S. PATENT DOCUMENTS

| 2,796,485 | A | * | 6/1957  | Durkee  | 49/351     |
|-----------|---|---|---------|---------|------------|
| 3,112,731 | A | * | 12/1963 | Lako et al. | 119/51.12 |
| 3,378,694 | A | * | 4/1968  | Griffeth | 307/132 R |
| 3,504,892 | A | * | 4/1970  | Crist   | 256/10     |
| 3,772,529 | A | * | 11/1973 | Boeing  | 307/132 R |
| 3,868,545 | A | * | 2/1975  | Caron   | 256/10     |
| 4,148,278 | A | * | 4/1979  | Anderson | 119/60    |
| 4,220,949 | A | * | 9/1980  | Pope et al. | 340/533 |
| 4,617,876 | A | * | 10/1986 | Hayes   | 119/842    |
| 4,706,941 | A | * | 11/1987 | Sherdan | 256/10     |

(Continued)

FOREIGN PATENT DOCUMENTS

EP          1 579 761          9/2005

OTHER PUBLICATIONS

International Search Report Issued May 10, 2013 in PCT/NL13/050217 Filed Mar. 25, 2013.

*Primary Examiner* — Daniel Wiley
(74) *Attorney, Agent, or Firm* — Oblon, McClelland, Maier & Neustadt, L.L.P.

(57) ABSTRACT

An electric fence for deterring animals from an area with one or more supplies of feed and at least one separate feed processing machine, wherein the fence comprises an electrically conductive member, an electric power supply connected to said member for energizing the member and arranged to provide an electric shock to an object coming into contact with said member. A controller is operatively connected to the fence, wherein the controller is arranged to measure a value of an electrical parameter of the fence, and to automatically adjust the operating state of the machine within the area when the measured parameter value fulfills a predetermined criterion.

15 Claims, 3 Drawing Sheets

(56) References Cited

U.S. PATENT DOCUMENTS

| | | | | |
|---|---|---|---|---|
| 5,355,834 A * | 10/1994 | Blazek | | 119/51.11 |
| 5,420,885 A * | 5/1995 | May | | 375/239 |
| 5,514,919 A * | 5/1996 | Walley | | 307/109 |
| 5,738,341 A * | 4/1998 | Lease | | 256/10 |
| 5,816,192 A * | 10/1998 | van der Lely et al. | | 119/57.92 |
| 6,519,131 B1 * | 2/2003 | Beck | | 361/232 |
| 7,308,866 B2 * | 12/2007 | Birk | | 119/14.03 |
| 7,685,968 B2 * | 3/2010 | Cooper | | 119/58 |
| 8,120,212 B2 * | 2/2012 | Hamm et al. | | 307/326 |
| 8,316,799 B2 * | 11/2012 | Van Den Berg | | 119/51.02 |
| 2010/0126423 A1 * | 5/2010 | Van Den Berg et al. | | 119/57.92 |
| 2010/0326363 A1 * | 12/2010 | Van Den Berg | | 119/57.92 |
| 2014/0034750 A1 * | 2/2014 | Van Kuilenburg et al. | | 239/71 |
| 2015/0034014 A1 * | 2/2015 | Van Kuilenburg | | 119/51.01 |

* cited by examiner

ELECTRIC FENCE AND ASSEMBLY THEREWITH

The present invention relates to an electric fence and an assembly therewith. Electric fences are used in practice among others for deterring animals from a specific area, such as a neighbouring pasture. It can also be used for deterring humans or animals from entering an area, such as one with supplies of feed.

In particular, they are also often used for safety reasons to deter living beings, humans or animals, from areas with machines, as these may present a danger to the humans, especially if they are not operators of the machines. Usually, such a fence comprises an electrically conductive member, an electric power supply connected to said member for energizing the member and arranged to provide an electric shock to an object coming into contact with said member, and a controller operatively connected to the fence. The fence, both known fences and the fences according to the present invention, may be arranged to provide high voltage pulses, either continuously or on demand, such as when it is detected that an object touches the fence or e.g. earths it. In any case, the high voltage pulse will have a voltage high enough to shock and deter any live being that touches the fence, but a low enough current and energy not to be harmful.

In practice, such electric fences do not always provide sufficient safety to animals and even to human beings, and the electric shocks or risk thereof prove to be an insufficient protection of the area.

It is therefore an object of the present invention to provide an electric fence of the kind described above, that provides more inherent safety to animals and humans.

This object is achieved with an electric fence according to claim 1, in particular an electric fence for deterring animals from an area with one or more supplies of feed and at least one separate feed processing machine, wherein the fence comprises an electrically conductive member, an electric power supply connected to said member for energizing the member and arranged to provide an electric shock to an object coming into contact with said member, and a controller operatively connected to the fence, wherein the controller is arranged to measure a value of an electrical parameter of the fence, and to automatically adjust the operating state of the machine within the area when the measured parameter value fulfils a predetermined criterion. With this measure, it can be assured that even when an animal or human crosses the fence, no further harm is done by moving machines, or at least a much reduced risk thereof. For it turns out that such electric fences are not that reliable in deterring beings. For example, humans may deceive the fence by cutting, or lifting, wires by means of (heavily) insulated utensils, but also animals may be able to cross the fence. In some cases, they run wild, due to panic or anger or the like, and simply rush through the physical and electric barrier. Still, either case leaves a human or animal in the area, and possibly within reach of the machine. But now, with no further barrier between the machine and the human or animal, danger looms. The present invention takes away this danger by adjusting the operating state of the machine when such danger is detected, in the form of the measured parameter fulfilling a predetermined criterion.

It is to be noted that the imminent danger of an animal crossing the electric fence is not purely speculative or highly exceptional. Although animals are creatures of habit, and livestock in particular is usually very familiar with electric fencing, it is possible that the animal is enticed by something in the area beyond the fence. This is especially true when something of interest is at the other side of the fence, such as a supply of feed. It will be obvious that supplies of its feed will attract an animal strongly. Therefore, chances are that at some point in time, there will be an animal that crosses the fence, whether enticed by the feed or by accident. In any case, it will then definitely be attracted further by the feed, bringing it in a danger zone of machines processing the feed, such as grippers, cutters and mixers. The present invention will reduce risks by adjusting the operating state of the machine, as will be explained further hereinbelow.

A remark to be made here is that there do exist safety systems in which touching e.g. a wire, bumper or other physical object or barrier shuts down a machine. However, using these by themselves does not make sense in the present case, as there is a strong lure present for animals. In practice, that would lead to a situation in which animals are attracted to an area because of feed present there. Then, an animal touching such a wire or the like would shut down the machine, making it even easier and safer for the animal to cross that barrier, walk around and eat from the feed now undisturbed. It will be clear that the average operating time of such a system would inevitably be very brief, in contrast to the present invention.

The feed processing machine may be any machine that handles or processes feed. Examples are a feed gripper, such as a bridge crane, a feed pusher such as the Lely Juno, an endless belt on which feed is transported, and so on. Furthermore, there may be provided a plurality of feed processing devices, such as a gripper and a mixer, and so on.

Herein, a situation for adjusting the operating state of the machine is that a measured value of an electric parameter of the fence fulfils a certain predetermined criterion. This is deemed to encompass the situation in which a variation of said parameter value fulfils a criterion.

Embodiments of the invention are described in the dependent claims, as well as hereinbelow.

In particular, the parameter comprises a voltage across, a conductivity of, and/or a current through the fence, although other parameters, such as capacitance, are not excluded. It is to be noted that measuring the impedance or the resistance is considered equivalent to measuring conductance. These parameters are selected because they can be easily measured with high precision, and a change in their value offers a clear indication of a situation in which a response by the controller is useful. The controller comprises a voltage meter, a conductivity meter, and/or a current meter, respectively. Alternatively or additionally, the controller may comprise a meter for measuring any other selected electric parameter.

In embodiments, the criterion comprises that the measured parameter value exceeds a predetermined corresponding threshold value. The measured parameter value exceeding a threshold, for a suitably selected threshold value, is a reliable indication of a human or animal contacting the fence or otherwise tampering with the fence. Herein, "corresponding" relates of course to the choice of the parameter. The exact values of the threshold varies according to the lay-out of the fence, but a useful threshold is easily determined by the skilled person, either from literature, from practice or otherwise, for example at the website http://www.uwex.edu/ces/crops/uwforage/energizer.pdf.

In embodiments, the controller is arranged to automatically adjust the operating state when the criterion is fulfilled at least a predetermined number of times. It is remarked that adjusting the operating state of the machine may lead to loss of production or have other negative consequences. In order to prevent these to a high extent, it is possible to adjust that state not just after a single, first time that the criterion is fulfilled, but only after a certain number of times, higher than one. In such a case, it can be ensured with high reliability that the fulfilling of the criterion was not caused by noise or some other irrelevant action, such as a tail accidentally touching the fence. The predetermined number of times may be any number, even one. In some instances, it is advantageous to take a plural number, in particular two or three. Such a number leaves out single instances, such as those caused by noise, but still allow a swift response by the controller.

In particular, the controller is arranged to automatically adjust the operating state when the criterion is fulfilled at least a predetermined number of times, preferably consecutively, during a predetermined first time period. This relates to the instances of the criterion being fulfilled lying within a predetermined time period. If too far apart, single instances may lose their meaning if a plurality of instances is to be decisive. Note that consecutive instances have more meaning than instances of fulfilling the criterion separated by instances in which it is not fulfilled, such as by tail swinging. The first time period may be selected in practice, such as from 2 to 5 seconds, in order to have a swift enough response without random events causing adjustment of the operating state too often.

Note that the above holds in particular for discrete instances, such as those determined per pulse, if the parameter is determined discretely instead of continuously, such as once per pulse if the fence is energised in a pulsed fashion, as it is almost always.

Alternatively or additionally, the controller is arranged to automatically adjust the operating state when the criterion is fulfilled during at least a predetermined time duration. Herein, it is assumed that a true reason for adjusting the operating state, only or additionally, exists in such cases, for example if the conductance remains above the threshold during said time duration. Again, said time duration may be selected in practice by the skilled person. For example, tail swinging will lead to contact times of less than a second, while standing against the fence will often lead to contact times of at least many seconds.

In particular, the operating state of the machine is adjusted to either an off-state, a stand-by state, a non-working state having no external moving parts, a slower state in which movements of the machine are slower than before the adjustment. Herein, a stand-by state is one without any active part in the machine except for a receiver part arranged to restart the machine and/or a state in which all power is shut-off except to said receiver part. A non-working state is a state in which no external part moves. All these states offer more safety for any animal or human being that happens to cross the fence, simply because either the machine can no longer move with respect to the animal or human, thereby preventing any accidents caused by the machine, or is moving more slowly, also reducing the risk of an accident and/or, in case of such an accident, the degree of injury.

In embodiments, the fence is provided with a gate and the controller is arranged to determine the state of said gate and automatically adjust the operating state of the machine on the basis of the determined state of said gate. In such embodiments, access to the area is providable via said gate. Such access may be obtained by an operator and/or possibly a machine entering from the outside for some purpose. Possible purposes for an operator are checking, maintaining or operating the machine in the area, while e.g. an external automatic machine may interact with the separate feed processing machine within the area in any desired way, such as to load, or be loaded by, the feed processing machine. Of course, a common case is when a farmer resupplies the area with new feed supplies, often with a tractor or the like. The gate may be a manually operated gate, such as a hooked gate or a simple door. It can also be an automatic gate, in particular of course for letting an automatic external machine enter the area. In some cases, the controller may adjust the operating state of the separate feed processing device when the gate is opened. This holds in particular if the gate is opened manually, to prevent human injury. If a gate is opened automatically for letting an external automatic machine or vehicle enter the area, it may be arranged to not adjust the operating state, as otherwise possibly none of any desired interaction with the separate feed processing machine may occur. Still, yet adjusting is not excluded. It is remarked that there may be a plurality of gates, of one or more types, such as a gate for a tractor, a gate for an operator and a gate for an automatic vehicle.

A particular embodiment of the electric fence according to the invention comprises a resetting means arranged to signal the controller to reset the operating state of the separate feed processing machine. The resetting means may be a simple knob, switch or button, or a function on a computer or the like, or any other known resetting means. It need not be, and is preferably not provided on the fence itself, but only operatively coupled or connected to the controller. By operating said resetting means, an operator may reset the controller, and thus the separate feed processing machine in the area. This may e.g. be done after the operator has worked in the area and has subsequently left the area. In the case of adjusting the feed processing machine based on an automatic vehicle entering the area through an automatic gate, there may be provided automatic resetting means that reset the feed processing machine when the automatic vehicle has left the area. Other variations are possible.

The invention also relates to an assembly comprising the electric fence according to the invention, an area at least partly delimited by the fence and accommodating at least one supply of food within the area, a separate feed processing machine within the area, arranged to process at least part of at least one supply of feed, wherein the controller is operatively connected to the fence and said separate feed processing machine. It will be clear that such an assembly offers the advantages as already described for a fence in use. Therefore, all advantages and technical effects mentioned for the fence will also hold in the corresponding assembly. Also, all remarks relating to interpreting terms and features hold for the assembly as well.

In particular, the separate feed processing machine comprises a movable gripper device arranged to pick up and move feed within the area, in particular a bridge crane. Such a device is not only often used in feed processing at a farm, for providing rations for e.g. cows, but it also presents a clear danger for animals or humans if their presence is not taken into account.

In embodiments, the assembly comprises at least a second separate machine within the area, in particular a stationary feed mixing device. In practice, feed often needs to be mixed before it can be fed to animals. Thereto, a mixer is provided, which may be stationary. Then, in use, the first feed processing machine, such as a gripper or the like, deposits feed into the mixer, which is subsequently mixed. Thereafter, it may be discharged for further use, such as feeding animals. Needless to say, such a mixing device can also present danger to humans or animals.

In particular embodiments, the assembly comprises an autonomous feed wagon arranged to move into and out of the area via a gate, and to receive feed from the separate machine, wherein the gate is controllable by the controller, and in particular is a part of the fence. In this particular embodiment, a high degree of automation is achieved, assuming that the feed processing machine(s) in the area are also automatic, which is implicitly assumed in all of the above. Herein, feed is automatically picked or gripped, possibly mixed in a mixing device, and subsequently deposited into the feed wagon. Thereto, the feed wagon can autonomously enter the area via an automatic gate, with no shutting down machine(s) in the area. After having been loaded, the feed wagon will then move out of the area through the gate. It will be clear that the safety features according to the present invention provide a lot of improvement, as is very useful in highly automated circumstances such as these, where no operator supervises the situation.

In embodiments, the assembly comprises a resetting means for resetting the separate feed processing machine, in particular by an operator, wherein the resetting means is located outside the area. As already explained above, such resetting means may serve to reset the operating state of any feed processing machine in the area of which the operating state has been adjusted by the controller due to the fulfilling of the criterion by the measured electric parameter of the fence. This resetting may be automatic, in case of an adjustment caused by an automatic vehicle or machine, or manual, if the adjustment was caused by a cause unknown to the controller, in particular touching of the fence by an object or opening of a gate by e.g. an operator. In particular in the latter case, resetting is preferably done outside the area, as this prevents accidental resetting while an operator is still inside the area.

The invention shall be now explained further using the following drawings, showing an exemplary embodiment of the invention.

Figure 1:
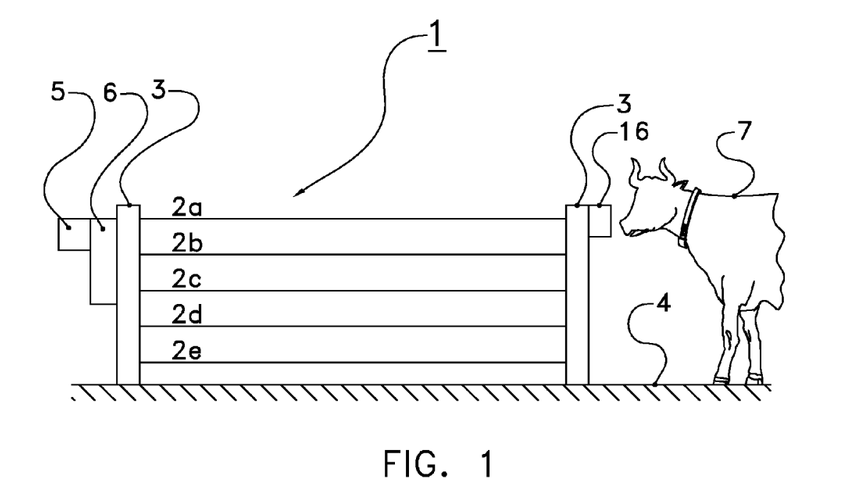
FIG. 1 is a schematic side view of the construction of the fence according to the invention.

FIG. 1 shows a schematic side view of the construction of the fence 1 for deterring an animal 7, and keeping it out of an area. The fence 1 has several horizontally spaced wires 2a, 2b, 2c, 2d, 2e supported by posts 3 on the ground 4 at a distance from each other and connected to an energizer 6. The fence 1 is furthermore connected to a controller 18, which comprises a control unit 5 and an impedance meter 16. When something, for example an animal 7, comes into contact with a wire 2a, 2b, 2c, 2d, 2e, the touch on the wire will cause a variation in the electrical parameter of the fence 1, in this case impedance, which is measured by the impedance meter of the controller 18. In addition to receiving a shock for deterring the animal 7, the animal 7 will be protected even further from harm as any machinery within the area behind the fence 1 will stop moving, as will be explained further below.

The distance between the wires 2a, 2b, 2c, 2d, 2e depends on the type of animal that needs to be kept out of the area, as a cow needs a different distance between the wires than for example sheep or goats. Other conductors than wires may of course be used, such as for example electrically conductive rope or ribbon.

The fence 1 can be provided with all live wires, not shown, or live wires with an earth return system, not shown, or a system with a combination of live and non-live return wires, the latter being shown in FIG. 1. It should be understood that any of these configurations is possible. In a fencing system with all live wires (not shown) the animal must touch one of the wires and the ground simultaneously to receive a shock, as the electricity travels from the energizer through the wires, then the animal and via the ground back to earth and into the energizer to complete the circuit. This configuration will work best if the ground has good conductivity. Then the animal will feel the electric shock to an extent where it will be startled and deterred.

A so-called earth return system (not shown), is especially advantageous in places where the ground does not conduct electricity very well, for example in places where the ground is often dry, cold or even frozen, or when the ground consists of concrete, plastic foil or some other non-conductive material. The energizer is connected similarly to the configuration as described above, with a connection to a live wire and a connection to earth via e.g. ground stakes. In this configuration, as opposed to the all live wire configuration, some wires are earthed through the ground stakes. Therefore, an animal has to touch both a live wire and an earthed wire simultaneously in order to complete the circuit and receive a shock. The electricity travels from the energizer to the live wire, via the animal back through the earth wire and into the energizer. Like this, it is easier to provide the conditions for the configuration to work properly, but since this system needs earth stakes, it is usually used on soft ground, such as grass, although the "earth" could be provided by e.g. a connection to plumbing.

The fence 1 as shown in FIG. 1 has a combination of live wires 2a, 2c, 2e and return wires 2b, 2d. The posts 3 support the wires 2a, 2b, 2c, 2d, 2e at regular intervals and are electrically insulated from the wires 2a, 2b, 2c, 2d, 2e by non-shown insulators. The fence 1 is connected to the controller 18, which the control unit 5 and the impedance meter 16 are operatively part of. Each live wire 2a, 2c, 2e is connected to a return wire 2b, 2d via the impedance meter 16, so the circuit runs from the energizer 6 through a live wire 2a, 2c, 2e via the impedance meter 16 back through a return wire 2b, 2d to the energizer 6 and the control unit 5. The controller 18 can measure an electrical parameter of the fence 1, and the control unit 5 can react and send a signal on the basis of this parameter. This shall be explained in further detail with regard to FIG. 5. This configuration is well suited for use on a non-conductive floor such as concrete.

It should be understood that to measure an electrical parameter of the fence, other meters than an impedance meter can be used, such as a voltage meter, a current meter or a resistance meter.

Figure 2:
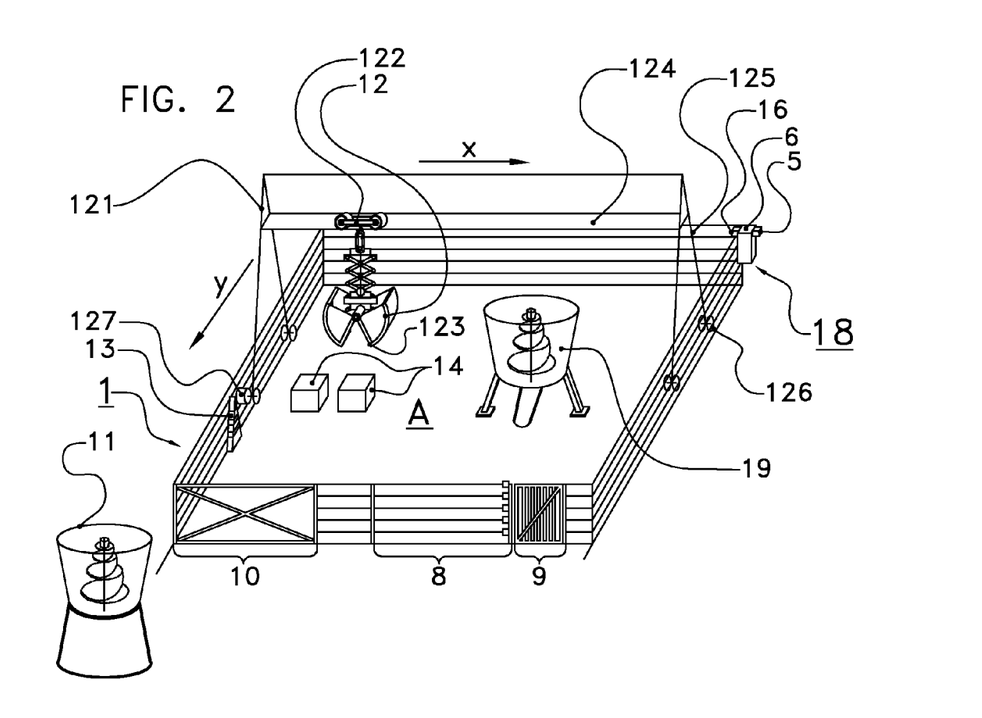
FIG. 2 is a perspective view of an exemplary configuration of an area with the fence system and machinery within the area, according to the invention.

FIG. 2 is a perspective view of an exemplary embodiment of the invention. It shows a protected area A with heaps of feed 14 stored within the area A, and surrounded by the fence 1. The fence 1 is connected to the energizer 6 and to the controller 18, which comprises the control unit 5 and the impedance meter 16. Inside the area A, a feed gripper 12 to pick up parts of the heaps of feed 14 is located, as well as a second machine in the form of a stationary feed mixer 19. To enter the area A, the fence 1 has several entrances, here a main gate 8, a door 9, and an automatic door 10. Inside the area A, a charging post 13 is placed to allow charging of e.g. an autonomous feed wagon 11 as it waits inside the area A to allow loading of feed by the feed gripper 12.

The feed gripper 12 is e. g. a bridge crane 121 with a trolley hoist 122 with a gripper 123 located above the ground 4 and the heaps of feed 14, so it can move freely over the area A in all directions. The bridge crane 121 may be e.g. a known crane which can move in both X and Y directions by moving the hoist trolley 122 over a ridge girder 124 in the X direction, and the ridge girder 124 in turn is supported by an A-frame 125 on either side. Both A-frames 125 have wheels 126, and can move along the ground 4 in the Y direction. This way, the feed gripper 12 can cover the entire area. The bridge crane 121 and the feed gripper 12 are powered by a motor 127.

The separate heaps of animal feed 14 can be picked up by the feed gripper 12 and moved to a different location inside the protected area A. This different location can for example be another place on the floor or in a container, or a feed wagon 11, or the stationary feed mixer 19. Preferably, the feed wagon 11 can be filled directly by the feed gripper 12, or indirectly by being supplied by the stationary feed mixer 19, which in its turn is then supplied by the feed gripper.

The heaps of feed 14 that can be picked up by the feed gripper 12 can be loose piles of feed, blocks of feed or can be stored in open-topped containers, as long as there is easy access to the feed from above. The feed can be any type of animal feed, such as hay, maize, silage and so on.

The main gate 8 can be used by large machines such as a tractor, not shown, for entering the area A to resupply the heaps of feed 14. This gate 8 can be a known hook gate as shown in FIG. 2, but other gates are also possible.

The fence 1 may also have a second smaller door 9 through which a person may enter. That way, an easier way of entering the area A is obtained, as it is an unnecessary burden on a person merely wanting to enter the area A to open a much wider and unwieldy main gate 8.

Figure 3:
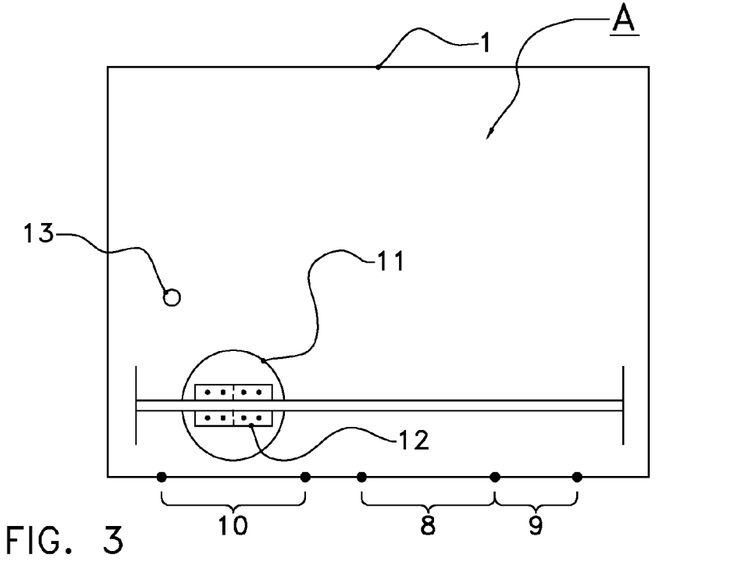
FIG. 3 is an elevational view of an exemplary configuration of an area with the fence system and machinery within the area, according to the invention.

FIG. 3 shows a top view of (a part of) FIG. 2. Here, the feed wagon 11 is inside the area A in the feed loading position beneath the feed gripper 12. To get inside area A, the feed wagon 11 enters through the automatic gate 10. The feed wagon 11 can announce its approach to the automatic gate 10 e.g. by sending a wireless signal, such as by a transponder on the wagon, and the automatic gate 10 will open in response to the received signal. Alternatively or additionally, the wagon 11 may be detected by a device on the gate, such as a camera with image recognition. The automatic gate 10 will be open very briefly and will close immediately after the feed wagon 11 has entered the area A. As such, it is not possible for an animal to enter the area A together with the feed wagon 11, and it is thus safe for the feed gripper 12 to continue its movement around the area A, and to load the feed wagon 11 as it waits for the feed loading process to finish. During the wait, the feed wagon 11 can be recharged at the charging post 13.

Figure 4:
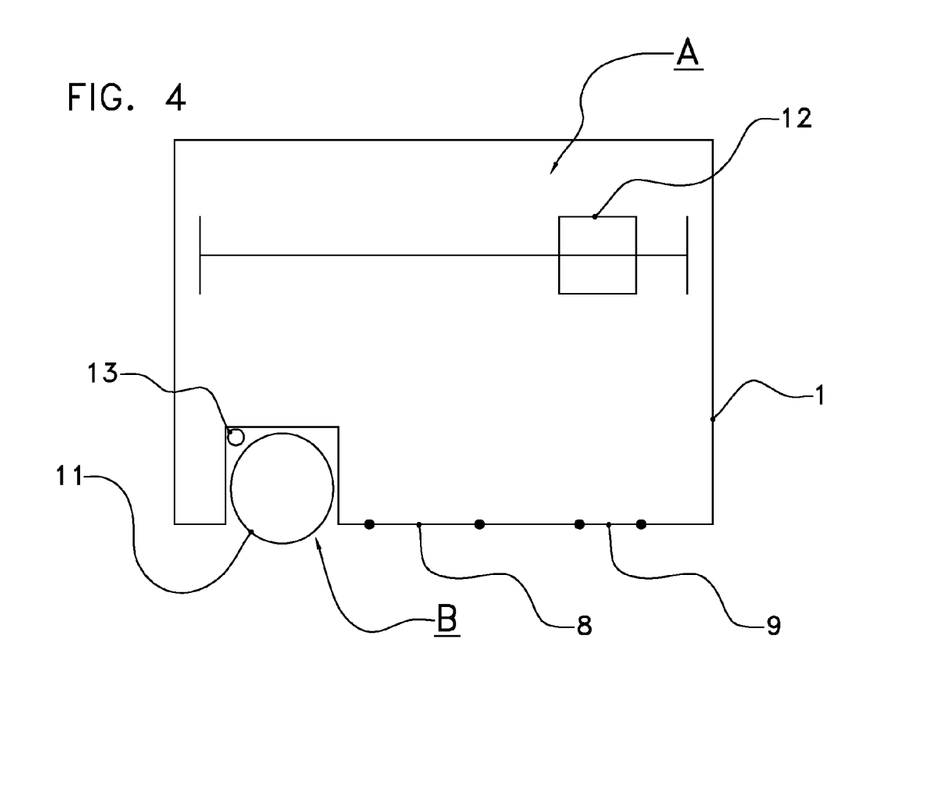
FIG. 4 is an alternative configuration of the area with the fence system according to the invention.

In FIG. 4, a top view of an alternative configuration is shown with the feed gripper 12 in the feed collecting position. In order to be able to fill the feed wagon 11, it is within range of the feed gripper's 12 working area, and as such, a recessed area B for the feed wagon 11 is provided within the area A. This recessed area B is delimited by the fence 1 on three sides, to ensure there is no opening for animals 7 to enter the area A. The recessed area B has a charging post 13 for the feed wagon 11, so it can reload its battery during the time it takes to fill the feed wagon 11 with the desired feed recipe. The recessed area B is not considered unsafe, as the feed gripper 12 will only move to this location when a feed wagon 11 has actually arrived there, which can only happen when the recessed area B was clear and unoccupied. Furthermore, it is possible that the controller of the feed gripper responds to the feed wagon 11 being charged at the post 13. Thus, the recessed area B does not need to be delimited by the fence 1, even though the feed gripper 12 can move over it, as this now poses no danger.

Figure 5:
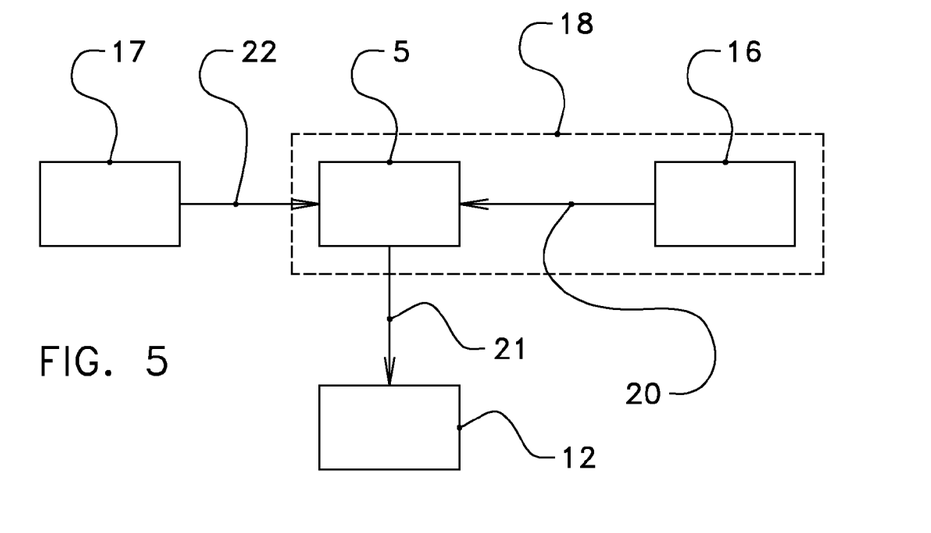
FIG. 5 is a block diagram of the components of the fence system according to the invention.

FIG. 5 is a block diagram of some of the components of the fence system. It shows the control unit 5, e.g. a suitably programmed CPU or the like, and the impedance meter 16, which together form the controller 18 as indicated by the dashed rectangle. Furthermore, the feed gripper 12 and a reset terminal 17 are illustrated in operative connection with the controller 18. The impedance meter 16 sends an electrical parameter signal S1 via a parameter signal connection 20 to the controller. Based on this signal S1, the control unit 5 may do nothing, or send a stop signal S2 to the feed gripper 12 via an operation signal connection 21. If the feed gripper 12 is stopped by the stop signal S2, it needs to be reset before it can be started again. The reset terminal is operated by an operator and sends a reset signal S4 via a reset signal connection 22 to the control unit 5, which then sends a start signal S3 via the operation signal connection 21 to the feed gripper 12. The feed gripper 12 can then once again move around the area A. When a feed wagon 11 is present within the area A, the control unit 5 will send a feed supply signal S5 via the operation signal connection to the feed gripper 12, to indicate that it can now move to the area where the feed wagon 11 waits for it to be loaded with the desired feed recipe.

The safety feature of the fence 1 works as follows, with reference to FIGS. 1-5, and explained as the system is in use.

The electric fence 1 keeps animals 7 from entering a particular area A, which has desirable heaps of feed 14 in it, and in which the animal 7 may encounter moving machinery such as a feed gripper 12. The fence 1 gives off an electric shock in a known way when it is touched, be it by an animal or e.g. a human, for example a child. This initial shock should be enough in most cases to deter the animal 7 touching the fence 1. However, if this is not the case when the animal 7 is too fixated on getting to the heaps of feed 14 beyond the fence 1, it may actually ignore the shock and push through the fence 1 regardless of any discomfort.

Therefore, an extra security is included. The control unit 5 of the controller 18 will receive the electrical parameter signal S1 from the impedance meter 16 and determine if there is a variation in said signal S1, which may occur as the fence is touched, opened or cut. If a certain criterion is fulfilled, by the variation or more generally by the signal S1, the control unit 5 will stop the feed gripper 12 within the area A. This variation may be determined as follows. The energizer 6 gives off voltage pulses at a set frequency across the wires 2a, 2c, 2e, which travel via the impedance meter 16 back through the return wires 2b, 2d. For the pulses, the impedance meter 16 determines the impedance of (each of) the wires or the whole system. Alternatively, the impedance meter 16 may determine the shape of the pulses/voltage peak signals, or determine any other desired electrical quantity. If the measured impedance or any other measured quantity differs more than a predetermined amount from a corresponding expected value, this will be considered caused by someone or something touching the wire(s), and an alarm signal or stop signal or the like will be generated. For example, the impedance meter 16 measures the impedance of the wires. A predetermined threshold is set, and when any one or more of the wires 2a, 2b, 2c, 2d, 2e is touched, opened or cut, the threshold will be exceeded. The control unit 5 will establish that a variation in the electrical parameter signal S1 has indeed occurred and will send a stop signal S2 to the feed gripper 12. The feed gripper 12 within the area A will then stop moving.

It is possible to consider exceeding the threshold (or fulfilling any other criterion) only once to be noise, and that a true touching of the wires will have occurred after exceeding the threshold e.g. three pulses in a row. After counting three pulses with an exceed threshold, a counter that counts the cases of exceeding the threshold will generate an alarm signal, after which the controller will generate the stop signal.

Otherwise, the counter will reset automatically. In a normal situation, the measured parameter will not exceed the threshold and nothing will happen.

When the feed gripper 12 is stopped, the controller 18 will notify an operator of the system and indicate that a problem has occurred and the fence 1 should be checked. If an animal 7 is still present near or even within the area A, it can be safely removed. When the situation is resolved, the operator should reset the system. For this, a reset terminal 17 is located a distance outside the fenced area A, so the operator has to be actually outside the area A in order to reach it. The reset terminal 17 sends a reset signal S4 to the control unit 5, which then releases the feed gripper 12 and any other stopped machine within the area A by sending a start signal S3. This prevents dangerous situations, as it is impossible for the farmer to reset the system, which would allow e.g. the feed gripper 12 to move again, when he or she is still inside the fenced area A.

A similar situation occurs when a door or gate is opened. A main gate 8 is provided for entering the area A with a large piece of equipment, such as a tractor (not shown), to facilitate the resupplying of the heaps of feed 14. FIG. 2 shows a known hook gate, wherein the operator manually removes the hooks from the post, thereby breaking the circuit of the fence 1. Herein, there may also be provided insulated grips for the hooks or wires, or there may be a stop button to switch off the fence manually. An alternative door 9 can also be used instead of the main gate 8 when it is only a person who wants to enter the area A, without taking a large piece of equipment.

When the circuit is broken in this way, the system may act the same as if the fence 1 is touched. The impedance meter 16 signals the control unit 5 with the electrical parameter signal S1 and establishes a variation in said signal S1. The control unit 5 will stop the feed gripper 12 et cetera within the area A in dependence on that signal S1 by sending a stop signal S2 to the feed gripper. It is then safe to enter the area and resupply the heaps of feed 14, as none of the machines within the area A is moving. After the operator has completed his task within the area A, he or she can exit the area A and close the main gate 8, or the door 9. This then closes the circuit again, but it does not release the feed gripper 12, as the system needs to be reset first. When the reset terminal 17 has been activated and a reset signal S4 has been sent to the control unit 5, the control unit 5 releases the feed gripper 12 to allow it to move again. This way, it is possible to close the main gate 8 or the door 9 from within the area A without restarting the feed gripper 12, thereby preventing the occurrence of a dangerous situation to the operator still inside the area A.

In an alternative configuration as seen in FIG. 4, the recessed area B is a small part of area A reserved for a feeding wagon 11, in particular an autonomous feed wagon. The recessed area B is open on one side to allow the feed wagon 11 to enter it freely, while the other sides are closed off by the fence 1. When a feed wagon 11 is present the control unit 5 instructs the feed gripper 12 to start loading the feed wagon 11 with the desired recipe with a feed supply signal S5. The feed gripper 12 will only go to the location above the recessed area B when the control unit 5 has sent the feed supply signal S5 to the feed gripper 12. As such, the recessed area B is safe and does not need to be enclosed on all sides by the fence 1, as the feed gripper 12 is only in the recessed area B when it is occupied by the feed wagon 11, which can only be the case if the recessed area B is otherwise unoccupied.

A charging post 13 is placed inside the recessed area B to recharge the feed wagon 11 when it occupies the recessed area B. The feed wagon 11 automatically connects to the charging post 13 upon entry of the recessed area, and it stays connected until the feed gripper 12 has finished loading the feed wagon 11. The feed wagon 11 then automatically disconnects and moves away from the recessed area B. Simultaneously, the feed gripper 12 moves away from the recessed area B, so that when the recessed area B is once again unoccupied, the feed gripper will no longer be above that area B, but instead safely within the confines of fence 1.

Figure 6:
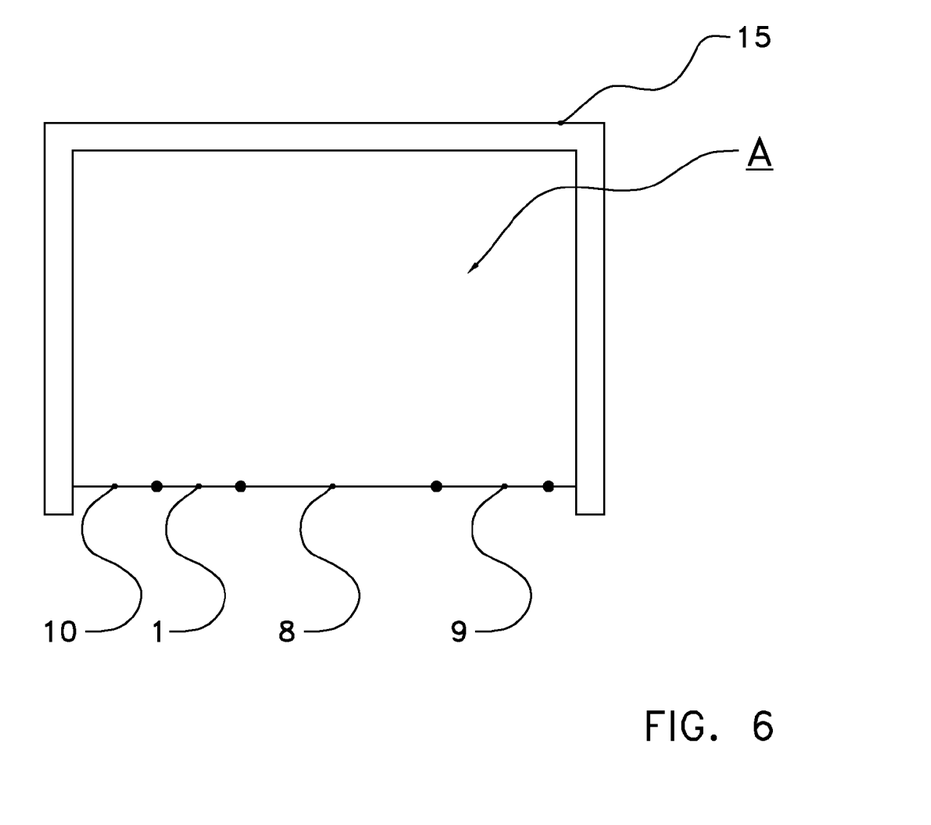
FIG. 6 is another possible configuration of the fence according to the invention.

Another possible configuration of the fence 1 is illustrated in FIG. 6. The area A in this case is not entirely delimited by the electric fence 1, instead, other barriers 15 are used for parts of the enclosure instead of electric fencing to ensure a completely closed off area A. Such barriers 15 may be anything that keeps an animal 7 from entering the area A and thus prevent unsafe or harmful situations for the animal, for example a brick wall of a building adjacent to the area A delimited by the fence 1. It would be unnecessary to place an electric fence so close next to the wall of a building, as it would be impossible for an animal to approach, let alone enter, the area A from that direction.

The stop signal S2 sent by the control unit 5 can be interpreted in several ways. It can mean for example that the machine within the area A, in this case the feed gripper 12, will enter a stand-by mode, an idler mode or a shut-down mode, the main idea being that the movement within the area by any machine is stopped.

It should of course be understood that other machines than a feed gripper 12 can be used within the area for the system to still work in the manner as hereby disclosed. An important example is the control unit 5 itself, which should be able to receive and process at least a reset signal to reset the feed gripper 12 and any other machine within the area. Also, if a device within the area does not present any harm, such as a closed heating system, or a refrigerator, these devices need not be switched to a safe mode (idle state, shut off, etc.).

The invention claimed is:

1. An electric fence assembly for deterring animals comprising:
    an area with one or more supplies of feed;
    at least one separate feed processing machine; and
    an electric fence, at least partially surrounding the area wherein the fence comprises:
        an electrically conductive member,
        an electric power supply connected to said member for energizing the member and arranged to provide an electric shock to an object coming into contact with said member, and
        a controller operatively connected to the fence,
        wherein the controller is arranged to measure a value of an electrical parameter of the fence associated with providing an electric shock to the object, and to automatically adjust an operating state of the feed processing machine within the area to prevent damage to the object from contact with the feed processing machine when the measured parameter value fulfils a predetermined criterion that indicates the electric shock has been provided to the object.

2. The electric fence assembly according to claim 1, wherein the parameter comprises a voltage across, a conductivity of, and/or a current through the fence, and wherein the controller comprises a voltage meter, a conductivity meter, and/or a current meter, respectively.

3. The electric fence assembly according to claim 1, wherein the criterion comprises that the measured parameter value exceeds a predetermined corresponding threshold value.

4. The electric fence assembly according to claim 1 wherein the controller is arranged to automatically adjust the operating state when the criterion is fulfilled at least a predetermined number of times.

5. The electric fence assembly according to claim 1, wherein the controller is arranged to automatically adjust the operating state when the criterion is fulfilled at least a predetermined number of times during a predetermined first time period.

6. The electric fence assembly according to claim 5, wherein the controller is arranged to automatically adjust the operating state when the criterion is fulfilled during at least a predetermined time duration.

7. The electric fence assembly according to claim 1, wherein the operating state of the feed processing machine is adjusted to either an off-state, a stand-by state, a non-working state having no external moving parts, or a slower state in which movements of the feed processing machine are slower than before the adjustment.

8. The electric fence assembly according to claim 1, wherein the fence is provided with a gate and wherein the controller is arranged to determine the state of said gate and automatically adjust the operating state of the feed processing machine on the basis of the determined state of said gate.

9. The electric fence assembly according to claim 1, comprising a resetting means arranged to signal the controller to reset the operating state of the separate feed processing machine.

10. The electric fence assembly according to claim 1, wherein the feed processing machine within the area is arranged to process at least part of at least one supply of feed, and wherein the controller is operatively connected to the fence and said feed processing machine.

11. The electric fence assembly according to claim 10, wherein the feed processing machine comprises a movable gripper device arranged to pick up and move feed within the area.

12. The electric fence assembly according to claim 10, further comprising at least a second separate machine within the area, in particular a stationary feed mixing device.

13. The electric fence assembly according to claim 10, wherein the assembly comprises an autonomous feed wagon arranged to move into and out of the area via a gate, and to receive feed from the feed processing machine, wherein the gate is controllable by the controller, and in particular is a part of the fence.

14. The electric fence assembly according to claim 10, comprising a resetting means for resetting the feed processing machine, in particular by an operator, wherein the resetting means is located outside the area.

15. The electric fence assembly according to claim 1, wherein the object is an animal.

* * * * *